Sept. 1, 1931.   O. A. LANGOS   1,821,184
MUSICAL TOY
Filed Dec. 30, 1929   3 Sheets-Sheet 1
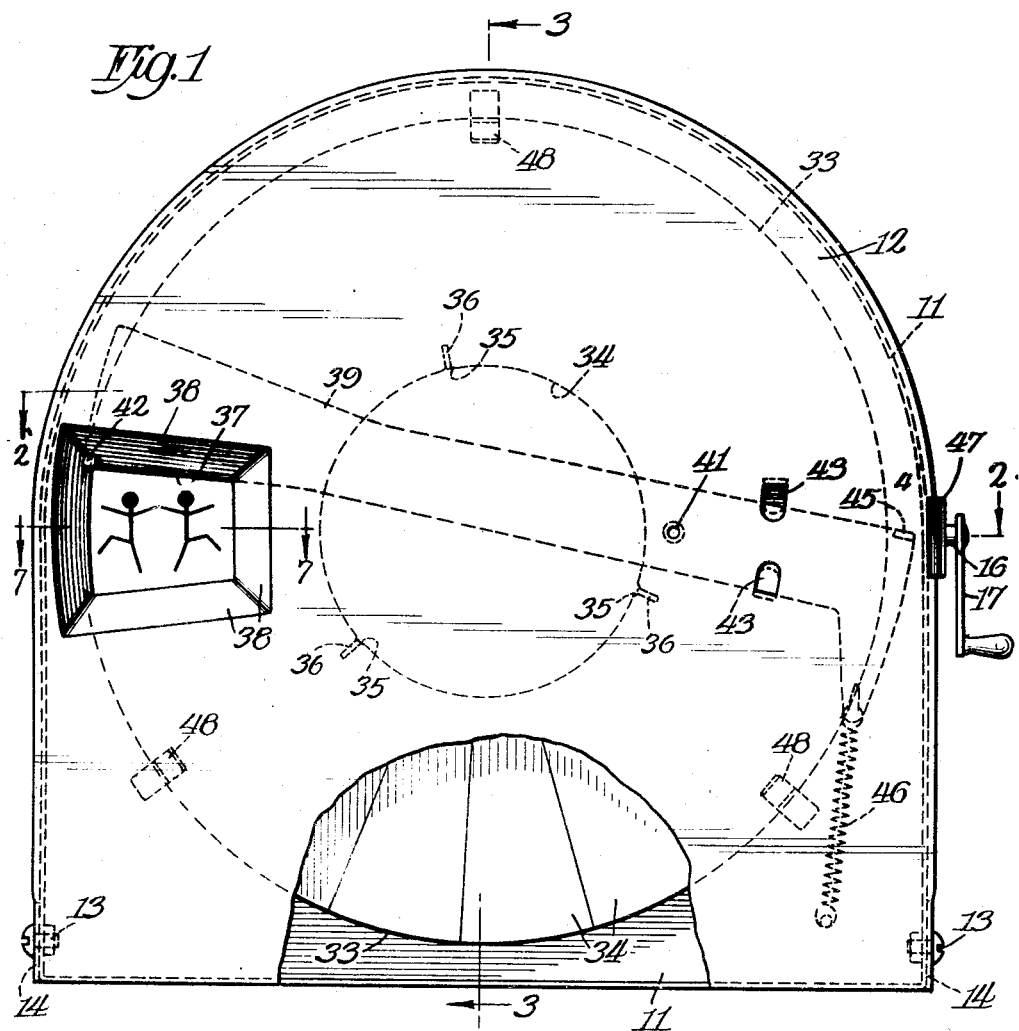
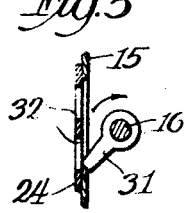
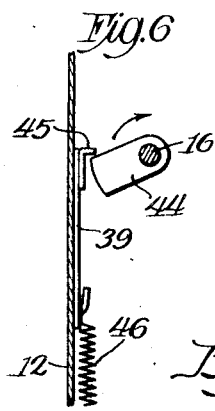
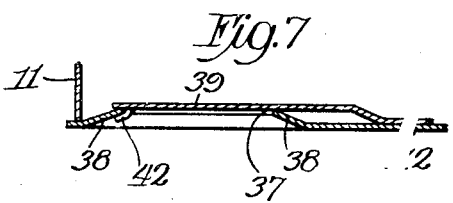
Inventor
Otto A. Langos
By George E. Mueller Atty.

Sept. 1, 1931. O. A. LANGOS 1,821,184
MUSICAL TOY
Filed Dec. 30, 1929 3 Sheets-Sheet 2
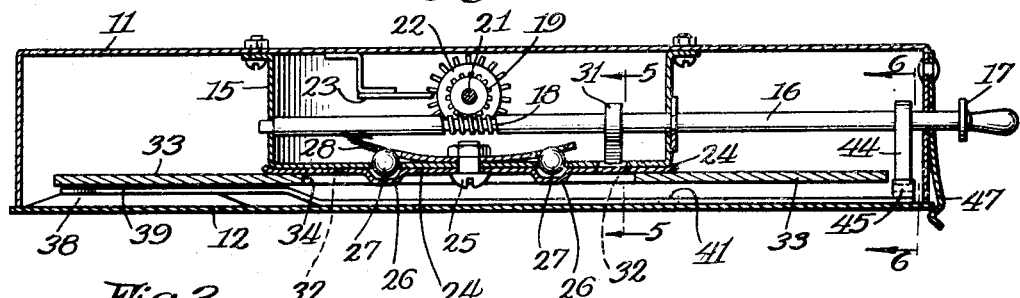
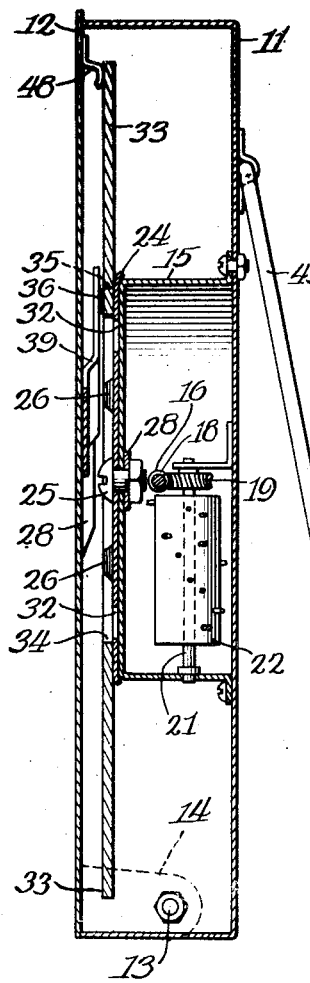
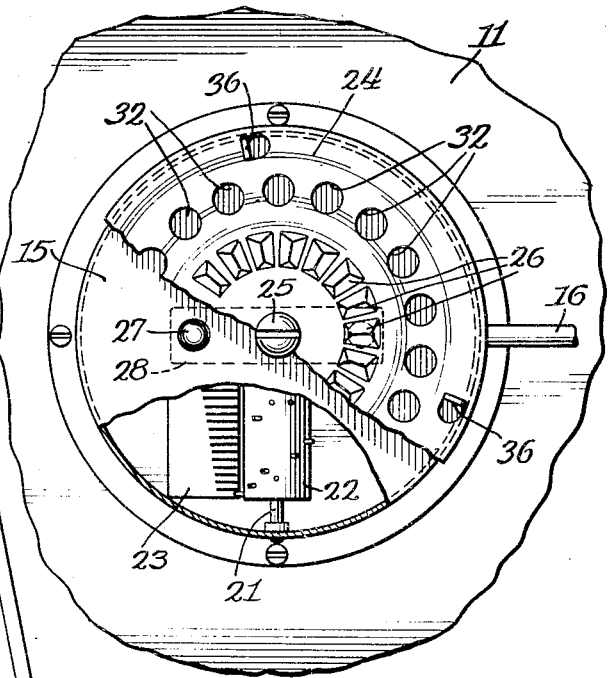
Inventor
Otto A. Langos
By George E. Mueller Atty.

Sept. 1, 1931.  O. A. LANGOS  1,821,184
MUSICAL TOY
Filed Dec. 30, 1929  3 Sheets-Sheet 3

Inventor
Otto A. Langos
By George E. Mueller Atty.

Patented Sept. 1, 1931

1,821,184

UNITED STATES PATENT OFFICE

OTTO A. LANGOS, OF CHICAGO, ILLINOIS

MUSICAL TOY

Application filed December 30, 1929. Serial No. 417,321.

My invention relates to a musical toy, and more particularly to a musical toy for producing moving pictures in synchronism with sound.

An object of the invention is to provide a new and improved musical toy.

A further object is to provide a toy which is simple and rugged in construction and effective in operation.

A further object is to provide a small and compact unit enclosed in a single housing for producing sound pictures.

A further object is to provide a musical toy in which the pictures may be readily changed by replacing the picture strip.

Other objects and advantages will appear as the description proceeds.

In accordance with the general features of the invention, an intermittently rotatable picture strip is provided in a compact housing through an aperture of which the pictures are exposed, and a sound producing device is mounted in the same housing and operable by the same driving mechanism, producing a small unit which is cheap to manufacture, and at the same time produces realistic and entertaining results.

Referring to the drawings,

Fig. 1 is a front elevation of the apparatus embodying my invention, with the cover plate partly broken away to show the disc.

Fig. 2 is a horizontal section of the apparatus taken on line 2—2 of Fig. 1.

Fig. 3 is a vertical section of the apparatus taken on line 3—3 of Fig. 1.

Fig. 4 is a fragmentary front view of a portion of the apparatus with the cover plate removed.

Fig. 5 is a detailed view showing the position of the drive shaft and cam at a particular instant.

Fig. 6 is a detailed view similar to Fig. 5 showing the drive shaft at the same instant as in Fig. 5.

Fig. 7 is a sectional view taken on line 7—7 of Fig. 1.

Figure 8:
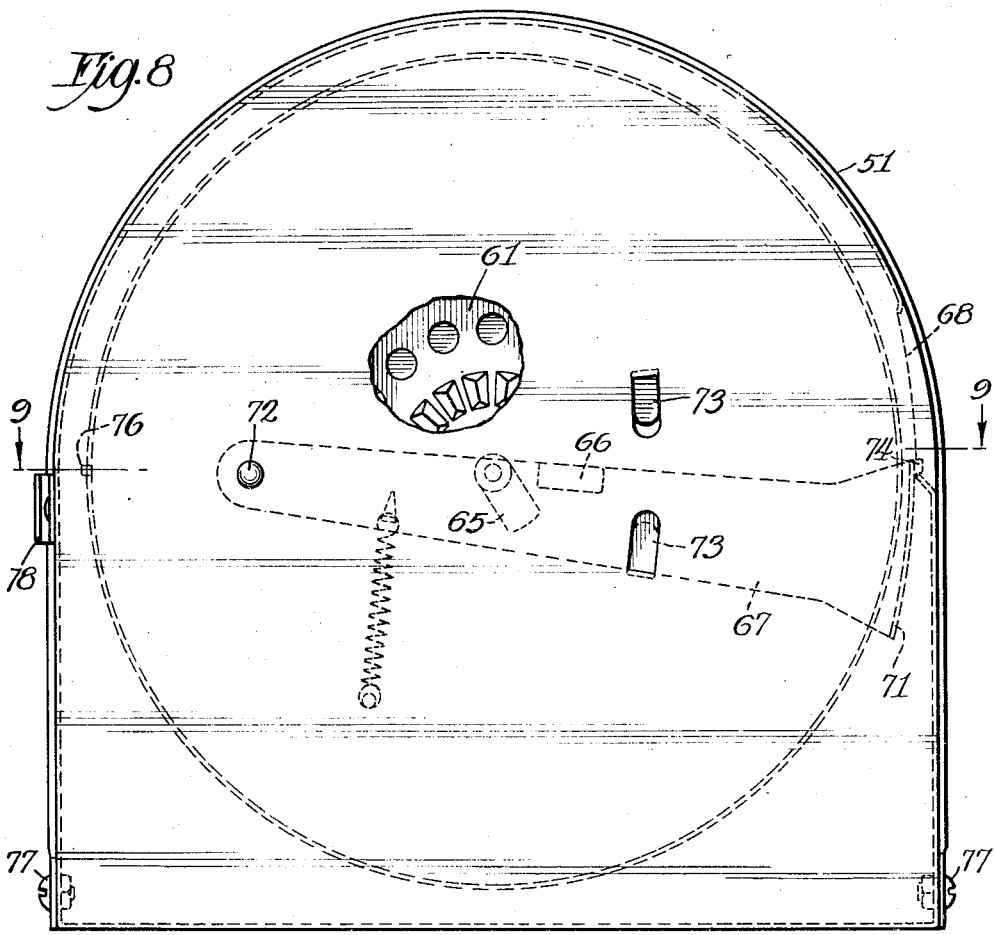
Fig. 8 is a front elevation showing a modified form of the invention.

The apparatus is mounted within a housing 11, having a cover plate 12. The cover plate has a pair of arms 14 extending perpendicularly from the plate and forming hinges in cooperation with bolts 13, to pivotally support the cover plate on the housing. Within the housing and secured to the back thereof, is a casing or apparatus support 15. Shaft 16, is journaled in this casing and extends through the housing to permit manual rotation thereof by means of a handle 17. A portion of shaft 16 is provided with worm teeth 18, which engage a worm gear 19, to rotate a shaft 21, upon which gear 19 is mounted. Shaft 21 carries a drum 22, having a plurality of pins or projections upon its periphery, which, upon rotation of the drum, actuate a set of reeds 23 mounted parallel to the axis of the drum. The position of the pins upon the drum determine the sound or melody produced by the reeds.

Mounted on the top of casing 15, is an intermittently rotatable disc 24, pivoted upon a bolt 25 in the center of the casing top. Disc 24 is provided with a plurality of radially extending depressions 26, concentrically arranged about the pivot point 25. The casing top is provided with apertures through which a pair of spheres 27 are urged into the depressions by a spring 28 secured to the inside of the casing top by bolt 25. The ends of spring 28 are provided with circular apertures of a lesser diameter than the spheres, thus serving to retain the spheres in position and continuously urging them forward. Upon the rotation of disc 24, the spheres will be forced rearwardly to ride over the surface of the disc between the depressions and as soon as the spheres begin to enter the following depression the disc will be thrown forwardly with a snap action as the spheres are forced into the depressions. The driving mechanism for the disc consists of a cam 31, mounted on shaft 16. This cam rotates idly during the major portion of a revolution. During one portion of its revolution it enters one of a series of apertures 32, concentrically arranged in the disc. The further rotation of the cam rotates the disc and causes spheres 27 to be raised out of their depressions, and when the cam has moved a predetermined distance, spring 28 and spheres 27 cooperate to move the disc to its following position with a snap action. The cam 31 then again rotates idly for a major portion of its revolution, repeating the cycle.

The intermittently operable disc 24 is adapted to receive a larger disc 33, which is divided into a plurality of sections 34, each of which is provided with pictures. The successive pictures are in slightly different positions to produce the effect of moving pictures. Due to the fact that the pictures are arranged successively around the periphery of the disc the scene is repeated each revolution. In order to prevent any offset or interruption in the display of the moving pictures each picture around the entire disc is so related to the preceding picture as to form an endless succession giving the effect of a continued uninterrupted movement when the pictures are exposed upon rotation of the disc. In other words there is no beginning or end to a scene as long as the device is operated.

The inside of disc 33 is provided with a large aperture 34, and a plurality of slots 35 are cut along the inner periphery of the disc. These slots are adapted to fit over lugs 36 formed on disc 24, to maintain the discs in fixed position with respect to each other. The pictures on disc 33 are exposed one at a time through an aperture 37 in the cover plate. This aperture is provided with an inwardly sloping edge 38, as shown in Fig. 7.

Between the disc and the aperture a shutter 39, is mounted which is pivoted at a point 41, to the cover plate. The end of shutter 39 has a guide lug 42 formed thereon which overlaps the edge 38 of the aperture to guide the shutter in its movement. Further guide lugs 43, are formed in the cover plate and extend over the shutter arm. The guide lugs 43 are spaced far enough apart not to interfere with the normal movement of the shutter.

In order to produce the best results, shutter 39 should cover aperture 37 while the disc is moving, and uncover the aperture as soon as the disc ceases to move. To this end, a cam 44 is mounted on shaft 16, which engages a projection 45 on the shutter during a portion of its revolution. The relative positions of cam 31 for actuating the disc and cam 44 for actuating the picture is shown in Figs. 5 and 6. It will be seen that cam 44 is about to engage projection 45 to close the shutter, and the shutter will be closed as soon as cam 31 engages the disc through one of the openings 32. After the disc has moved to its succeeding position, cam 44 will release projection 45, and a spring 46 will open the shutter with a snap action.

The rotation of handle 17 will, therefore, produce musical sounds which are in synchronism with the picture produced in aperture 37, because the sound and picture producing devices are mechanically interconnected and operable from the same source of manual power. The cover for the apparatus is held in its closed position by means of a detent 47. In order to change the pictures, detent 47 is released, allowing the cover plate to turn about its lower edge and open the casing. Disc 33 may then be lifted from its position and replaced by another disc having a different picture strip. When the picture disc has been changed the cover is closed and the device may again be operated in the usual manner.

The cover plate is preferably provided with a plurality of guides 48 to retain the disc in position and preventing it from interfering with the operation of shutter 39 which is pivoted on the cover plate. The back of the housing may be provided with an arm 49 to permit the device to be supported on a table or other flat surface at a slight inclination to facilitate viewing the picture and operating the device.

Figure 9:
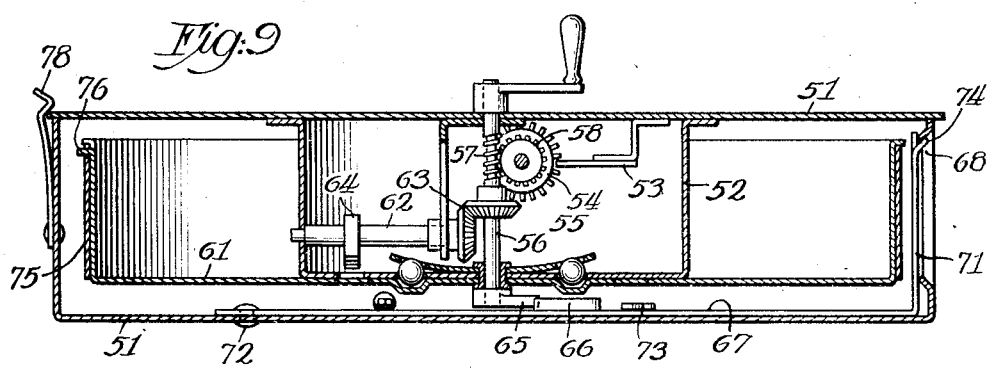
Fig. 9 is a horizontal section of the apparatus shown in Fig. 8 taken on line 9—9 of this figure.

Figs. 8 and 9 show a modified form of the invention. In this form of the invention a housing 51 is provided with a casing or apparatus support 52. Within the casing a series of reeds 53 is supported operable by a drum 54, having projections 55 thereon. A manually operable shaft 56 having a worm 57 actuates the drum through a worm gear 58. An intermittently rotatable drum 61 is mounted upon the casing similar to disc 24 in the preferred embodiment of the invention. Shaft 56 is coupled to a second shaft 62, through bevel gears 63, and has a cam 64 mounted thereon for imparting intermittent movement to the drum 61. On the end of shaft 56 is secured a cam 65 cooperating with a projection 66 on a shutter 67 to intermittently actuate the shutter to close an aperture 68 in the housing while the picture is moving. Shutter 67 has an end portion 71 at right angles to the arm of the shutter so as to move in front of the aperture 68 in the side of the housing. Shutter 67 is pivoted at 72 and a pair of guides 73 are formed in the housing to guide the shutter in its movement. The end of the shutter is also provided with a projection 74 providing a groove for cooperating with the inturned edge of aperture 68 to further assist in guiding the shutter. The picture strip in this form of the invention is carried by a removable drum 75, adapted to fit over the intermittently rotatable drum 61. Drum 75 is preferably provided with a small slot for engaging a projection 76 on drum 61, to insure proper alignment of the pictures with aperture 68, and prevent rotational movement of drum 75 with respect to drum 61. The housing is made in two parts, hinged together at 77, and the parts are maintained in their closed position by a detent 78. Upon opening the housing convenient access may be had to the apparatus to replace disc 75 with another disc having a different series of pictures thereon.

The apparatus described is devised to form a small and compact unit which can be manufactured at a low cost and within the price limit to which the cost of toys must be restricted. The device, in addition to being a toy, has considerable educational merit in teaching youngsters the fundamental principles of moving picture and synchronized sound producing apparatus.

It will be understood that the embodiments of the invention herein described and illustrated, are merely illustrative of the nature and form of my invention and that many other modifications may be made without departing from the spirit and scope of the invention.

What I claim is new and desire to protect by Letters Patent of the United States is:—

1. In a toy of the character described, a casing, a plurality of reeds mounted in said casing, a rotatable drum in said casing having projections for actuating said reeds, intermittently operable means mounted on the casing, a shaft for rotating said drum and actuating said intermittently operable means, a disc removably mounted on said intermittently operable means, and means for exposing to view a portion of said disc at a time.

2. In a toy of the character described, a casing, a rotatable disc mounted thereon, a plurality of indentations concentrically disposed in said disc, resiliently mounted means engaging at least one of said indentations, a cam for rotating said disc and cooperating with said resiliently mounted means for causing intermittent movement of the disc, a plurality of sound producing members, means for actuating said members to produce sound in synchronism with the movement of the disc.

3. In a toy of the character described, a casing, a shaft mounted in said casing, a rotatable drum, means cooperating with the drum to produce sounds, a worm and gear for operating the drum from said shaft, an intermittently rotatable disc, a cam on said shaft for actuating said disc, means associated with said disc for producing a snap action of said disc from one position to another, and means for exposing a portion of said disc at a time to produce moving pictures.

4. In a toy of the character described, a casing, a shaft mounted in said casing, a rotatable member for producing sounds, a worm and gear for operating said member from said shaft, an intermittently rotatable disc, a cam on said shaft for actuating the disc, means for causing a snap action of the disc, from one position to another, means for exposing a portion of said disc at a time, means for concealing said portion of the disc during movement of the disc and a cam on said shaft for actuating said concealing means.

5. In a toy of the character described, a sound producing means, a rotatable disc, means for intermittently rotating said disc with a snap action, a cover for said disc having an aperture for exposing a portion of said disc, a shutter pivotally mounted on said cover for said aperture, and an operating means for the sound producing means, said operating means being effective to actuate the disc and shutter in a predetermined time relation.

6. In a toy of the character described, a housing having a hinged cover plate, an apparatus support in the housing, sound producing means mounted on said support, an intermittently operable rotatable member mounted on the support, a replaceable member removably mounted on said rotatable member, guide members secured to the cover plate to retain said replaceable member in position on the rotatable member, and means for actuating the sound producing means and causing intermittent movement of the rotatable member.

7. In a toy of the character described, a housing, a cover plate having an aperture therein and pivotally secured to the housing, an apparatus support in the housing, a shaft mounted in the apparatus support and extending from the housing for manual operation, sound producing means operated by said shaft, an intermittently operable device mounted on the support and operable by said shaft, a disc removably mounted on said device, said disc being held in position by the cover plate, said cover plate having an aperture therein for exposing a portion of the disc to view, a shutter pivotally mounted on the cover plate for closing the aperture while the disc is moving, and means on said shaft for actuating the shutter.

8. In a toy of the character described, a housing, a cover plate having a shutter therein and pivotally secured to the cover plate, an apparatus support in the housing, a shaft journaled in the support and extending from the housing, sound producing means continuously operable by said shaft, an intermittently operable disc, an intermittently operable shutter, and a pair of cams mounted on the shaft in such spaced relation as to produce a predetermined time relation in the operation of the disc and shutter.

9. In a toy of the character described, a housing, an apparatus support in said housing, a shaft rotatably mounted in said support, sound producing means, moving picture producing means, a gear on said shaft for continuously operating said sound producing means, and a cam on said shaft for imparting intermittent movement to said moving picture producing means.

10. In a toy of the character described, a casing, a drive shaft journalled in said casing, sound producing means in said casing, a shaft for operating said sound producing means perpendicular to said drive shaft, a rotatable disc in a plane parallel to the plane of the drive shaft, a cam on the drive shaft for intermittently rotating said disc, a shutter having an arm movable in a plane parallel to said disc, and a cam for intermittently operating said shutter.

11. In a toy of the character described, a drive shaft, means for rotatably supporting said drive shaft, sound producing means operated by said drive shaft, a rotatable disc in a plane parallel to the plane of the shaft, a cam on said shaft for intermittently operating said disc, a shutter having an arm movable in a plane parallel to the plane of said disc, a projection on said arm, and a cam on the drive shaft cooperating with said projection for intermittently operating said arm.

12. In a toy of the character described, a drive shaft, means for rotatably supporting said drive shaft, a rotatable disc in a plane parallel to the plane of the shaft, a cam on said shaft for intermittently operating said disc, a shutter having an arm movable in a plane parallel to the plane of said disc, a projection on said arm, and a cam on the drive shaft cooperating with said projection for intermittently operating said arm.

13. In a toy of the character described, a housing, an apparatus support in said housing, a shaft rotatably mounted in said support, sound producing means, moving picture producing means including a rotatable disc, a picture carrying disc having means for engaging said rotatable disc to rotate in unison therewith, a covering for said housing, and means on said cover for retaining said picture carrying disc in engagement with said rotatable disc, whereby said picture carrying disc may be withdrawn from the housing when the cover is removed.

In witness whereof, I hereunto subscribe my name this 27th day of November, 1929.

OTTO A. LANGOS.